US012642202B1

(12) United States Patent
Shoham

(10) Patent No.: US 12,642,202 B1
(45) Date of Patent: Jun. 2, 2026

(54) METHOD AND SYSTEM FOR ADDING MICROBIOME BENEFICIAL PROMOTERS TO PLANTS

(71) Applicant: GreenOnyx LTD, Tel Aviv (IL)

(72) Inventor: Tsipi Shoham, Tel Aviv (IL)

(73) Assignee: GreenOnyx LTD, Tel Aviv (IL)

( * ) Notice: Subject to any disclaimer, the term of this patent is extended or adjusted under 35 U.S.C. 154(b) by 0 days.

(21) Appl. No.: 19/214,962

(22) Filed: May 21, 2025

(51) Int. Cl.
*A01G 31/02* (2006.01)

(52) U.S. Cl.
CPC .................................... *A01G 31/02* (2013.01)

(58) Field of Classification Search
CPC ...................................................... A01G 31/02
See application file for complete search history.

(56) References Cited

U.S. PATENT DOCUMENTS

| | | | |
|---|---|---|---|
| 11,807,871 B2 | 11/2023 | Novak et al. | |
| 2015/0234394 A1 | 8/2015 | Shoham et al. | |
| 2015/0250113 A1 | 9/2015 | Shoham et al. | |

| | | | |
|---|---|---|---|
| 2018/0127794 A1* | 5/2018 | Glukhman | A01H 4/005 |
| 2021/0007363 A1* | 1/2021 | Aharoni | A61K 36/13 |
| 2022/0132864 A1* | 5/2022 | Zorner | C05F 11/10 504/117 |
| 2023/0332097 A1* | 10/2023 | Lapidot | C12N 1/205 |
| 2025/0024800 A1* | 1/2025 | Lam | A01G 31/06 |
| 2025/0043222 A1* | 2/2025 | Heckart | C12N 1/20 |

FOREIGN PATENT DOCUMENTS

WO 2023/102565 A1 6/2023

OTHER PUBLICATIONS

Translation of JP_2009195124_A (Year: 2009).*

* cited by examiner

*Primary Examiner* — Timothy D Collins
*Assistant Examiner* — Brittany A Lowery
(74) *Attorney, Agent, or Firm* — Sterne, Kessler, Goldstein & Fox P.L.L.C.

(57) ABSTRACT

The present disclosure includes a method for supplying microbiome beneficial promoters to plants, the method comprising: (a) providing a receptacle for cultivating the plants; (b) inserting culture medium into the plant receptacle for cultivating the plants; (c) inoculating the plants in the plant receptacle for cultivation; (d) cultivating the plants under sterile conditions in the plant receptacle; and (e) providing microbiome beneficial promoters to the plants in the plant receptacle under the sterile conditions.

10 Claims, 4 Drawing Sheets

METHOD AND SYSTEM FOR ADDING MICROBIOME BENEFICIAL PROMOTERS TO PLANTS

TECHNICAL FIELD

The present disclosure generally relates to the cultivation of plants. More particularly, embodiments relate to the addition of microbiome beneficial promoters to plants during cultivation.

BACKGROUND

Plant microbiome is known to play an important role in plant health and food production, as plants typically live in association with diverse microbial consortia (e.g. microbiota) in nature. The microbiome typically comprises a characteristic microbial community occupying a reasonably well-defined habitat which has distinct physio-chemical properties. Examples of beneficial promoters imparted by the plant-associated microbial communities include promoters for protection against pathogens, bioavailability of nutrients and vitamins otherwise inaccessible to plants, increased plant size and crop yield, and broad-scale acceleration of plant growth rate. Microbial communities, capable of imparting beneficial promoters, can be introduced to each plant one or more times and managed throughout the plant's growth cycle to promote plant health and growth. The microbial communities can be influenced by the host plant and/or by external factors.

There are many diverse microorganisms that live in, on, or nearby growing plants. While some of these microbial species are beneficial to the plants, others can be harmful (e.g. pathogens) to the plants. In addition, some of these microbial species can be beneficial to humans, while others can be harmful (e.g. pathogens) to humans. Thus, the management of the microbiome community and selection of the beneficial species are desirable.

WO2023102565 discloses a method for microbiome manipulation to improve plant health, plant growth, and crop yield. The disclosed method includes identifying a desirable phenotype exhibited by a plant, extracting a sample containing a microbial community from the medium associated with the plant, wherein the medium comprises plant roots from the plant or plant foliage from the plant or growth substrate in which the plant grew or nutrient solution that was used to irrigate the plant, and preparing an inoculant containing multiple microbial species from the microbial community to apply to a second target medium associated with growth of a second crop. Nevertheless, the described method is cumbersome, especially for large operations.

U.S. Pat. No. 11,807,871 discloses a microfluidic device for sustaining a complex microbial community in direct and indirect contact with living human intestinal cells in vitro. The disclosed experimental system can support dynamic interactions between living human intestinal epithelium and a directly apposed complex community of living human aerobic and anaerobic commensal gut microbes with a population diversity similar to that observed in living human intestine. The disclosed human Gut Chip is modified by culturing human intestinal microvascular endothelial cells in a lower channel, integrating microscale oxygen sensors into the device for in situ oxygen measurements, and placing the Gut Chip within an engineered hypoxic chamber to establish a physiologically relevant oxygen gradient across the Gut Chip vascular and epithelium channels. To emulate the physiological human intestinal gut-microbiota interface onchip, complex microbiota is derived from healthy human stool specimens, which have been maintained stably in gnotobiotic mice for multiple years. The publication also describes how to establish a hypoxia gradient across engineered endothelium-epithelium interface of the Gut Chip, which allows stable co-culturing of complex communities of anaerobic and aerobic human commensal gut bacteria in direct contact with human villus intestinal epithelium while simultaneously monitoring oxygen levels for multiple days in vitro. Nevertheless, the described device is complex.

It would therefore be desired to propose a method void of these deficiencies.

SUMMARY

It is an object of the present disclosure to provide a system and method for the sterile cultivation of plants while supplying the plants with microbiome beneficial promoters.

It is another object of the present disclosure to provide a system and method for cultivating plants in a sterile and controlled environment without their microbiome, and supplying the plants with microbiome beneficial promoters from a preselected assortment of microbiome.

It is still another object of the present disclosure to provide a system and method for cultivating plants separately from their microbiome, where the plants feed and stimulate the microbiome and the microbiome supply beneficial promoters to the plants while keeping the plants' culture sterile.

It is still another object of the present disclosure to provide a system and method for the co-culturing of plants and preselected microbiome in a sterile and controlled environment while preventing harmful pathogens from entering the controlled environment of the plants' culture.

It is still another object of the present disclosure to provide a system and method for managing the selected microbiome and their imparted beneficial promoters.

Other objects and advantages of embodiments according to the present disclosure will become apparent as the description proceeds.

The present disclosure relates to a method for supplying microbiome beneficial promoters to plants, the method comprising: (a) providing a plant receptacle for cultivating said plants; (b) inserting culture medium into said plant receptacle for cultivating said plants; (c) inoculating said plants in said plant receptacle for cultivation; (d) cultivating said plants under sterile conditions in said plant receptacle; and (e) providing microbiome beneficial promoters to said plants in said plant receptacle under said sterile conditions.

In one embodiment, a preselected microbiome for imparting said microbiome beneficial promoters associated with said plants is added to said plant receptacle and co-cultured with said plants.

In one embodiment, the method further comprises providing a preselected microbiome for imparting said microbiome beneficial promoters associated with said plants in said plant receptacle, wherein said plant receptacle comprises at least one compartment separated by at least one filter from said plants for cultivating said preselected microbiome, wherein said at least one filter permits the transfer of said microbiome beneficial promoters imparted by said preselected microbiome to said plants while preventing the transfer of said preselected microbiome to said plants; and wherein said preselected microbiome and said plants are co-cultured within said plant receptacle and share a common culture medium, while said preselected microbiome is held in a separate compartment within said plant receptacle.

In one embodiment, said plants are cultivated in said plant receptacle, and a preselected microbiome is provided and cultivated in a microbiome receptacle separate from said plant receptacle; said plant receptacle comprises at least one conduit comprising at least one filter for connecting to said microbiome receptacle; said at least one conduit enables a fluid communication between a microbiome culture medium in said microbiome receptacle and a plant culture medium in said plant receptacle; and said at least one filter permits the transfer of said microbiome beneficial promoters imparted by said preselected microbiome to said plant receptacle while preventing the transfer of said preselected microbiome to said plant receptacle.

In one embodiment, the method further comprises transferring microbiome stimulators exuded by said plants from said plants to said preselected microbiome.

In one embodiment, said plants receive said microbiome beneficial promoters imparted from a preselected microbiome as substrates in a plant culture medium.

In one embodiment, said preselected microbiome receives stimulants exuded from said plants as substrates in a microbiome culture medium.

The present disclosure further relates to a system for supplying microbiome beneficial promoters to plants, the system comprising: (a) a plant receptacle for cultivating said plants under sterile conditions; (b) culture medium for inserting into said plant receptacle for cultivating said plants; (c) plant-inoculum for inserting into said plant receptacle for cultivation; and (d) beneficial promoters associated with said plants in said plant receptacle for providing to said plants in said plant receptacle under said sterile conditions.

In one embodiment, a preselected microbiome capable of imparting said microbiome beneficial promoters associated with said plants is added to said plant receptacle and co-cultured with said plants.

In one embodiment, the system further comprises a preselected microbiome wherein said plant receptacle comprises at least one compartment separated by at least one filter from said plants for cultivating said preselected microbiome; wherein said at least one filter permits the transfer of said microbiome beneficial promoters imparted by said preselected microbiome to said plants while preventing the transfer of said preselected microbiome to said plants; and wherein said preselected microbiome and said plants are co-cultured within said receptacle and share a common culture medium.

In one embodiment, the system further comprises a microbiome receptacle for cultivating a preselected microbiome, wherein said plants are cultivated in said plant receptacle and said preselected microbiome is cultivated in said microbiome receptacle separate from said plant receptacle; said plant receptacle comprises at least one conduit comprising at least one filter for connecting to said microbiome receptacle; said at least one conduit enables a fluid communication between a microbiome culture medium in said microbiome receptacle and a plant culture medium in said plant receptacle, and said at least one filter permits the transfer of said microbiome beneficial promoters imparted by said preselected microbiome to said plants while preventing the transfer of said microbiome to said plant receptacle.

In one embodiment, said at least one filter is further used for transferring microbiome stimulators exuded by said plants from said plants to said preselected microbiome while preventing the transfer of said plants.

In one embodiment, a plant culture medium comprises said microbiome beneficial promoters imparted from a preselected microbiome as substrates in said culture medium.

In one embodiment, a microbiome culture medium comprises stimulants exuded from said plants as substrates in said culture medium.

BRIEF DESCRIPTION OF THE DRAWINGS

The accompanying drawings, and specific references to their details, are herein used, by way of example only, to illustratively describe some of the embodiments of the disclosure.

DETAILED DESCRIPTION

Figure 1:
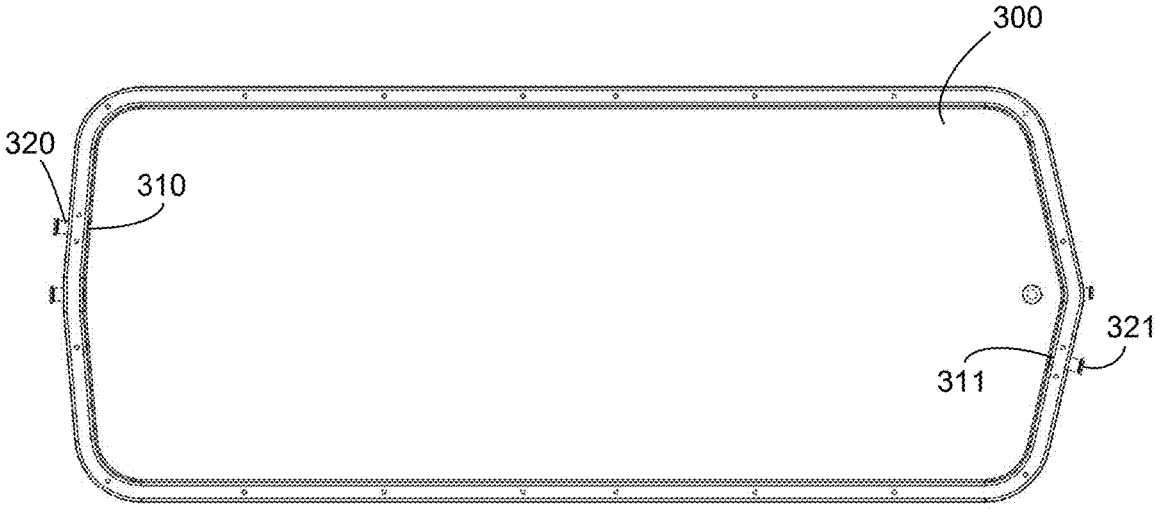
FIG. 1 shows a top view of an exemplary receptacle for cultivating aquatic plants in a controlled environment, according to some embodiments.

Duckweeds are tiny flowering aquatic plants that belong to the family Lemnaceae, which consists of five genera; *Spirodela, Landoltia, Lemna, Wolffia*, and *Wolffiella*, which also have a diverse microbiome in their natural habitat. Several potential plant growth-promoting bacteria have been found in duckweeds. For instance, *Acinetobacter calcoaceticus* P23 has been proven to benefit *Lemna aoukikusa* by promoting biomass and facilitating phytoremediation. Co-cultivation of two bacteria strains, Ac. *calcoaceticus* P23 and *Pseudomonas* sp. Ps6, enhanced growth of *Lemna minor*. An indigenous wastewater bacterium, *Chryscobacterium* sp. 27AL, promoted biomass production of *Lemna gibba* under N-rich wastewater and limited-N conditions. The microbial community associated with natural growing duckweeds has been identified to consist of members in phyla Proteobacteria, Bacteroidetes, Firmicutes, and Actinobacteria as well. The most abundant microorganism belonged to the genus *Rhodobacter*, followed by other common duckweed-associated bacteria, including *Acinetobacter, Allorhizobium, Neorhizobium, Pararhizobium, Rhizobium*, and *Pseudomonas*. It was also found that the duckweed inoculated microbial community, in the natural habitat, was changed over time during phytoremediation process and was affected by the indigenous bacteria. Thus, it is also desired to manipulate and protect the microbiome itself in order to ensure continuous production of the microbiome beneficial promoters for plants while preventing detriment to the microbiome from indigenous bacteria or other microorganisms.

Recent studies have shown that vitamin B12 can be produced by the natural microbiome of duckweeds, and as a result, the content of vitamin B12 in natural duckweed culture can vary between 0.5 to 10 μg/100 g of dry plant matter. Furthermore, targeted inoculation of duckweed with specific bacterial strains could provide a stable concentration of vitamin B12 in the duckweed cultures. Vitamin B12 daily intake is highly recommended for human beings. Thus, controlling co-cultures of specific microbiome bacteria with duckweeds is desirable.

The indefinite articles "a," "an," and "the" include plural referents unless clearly contradicted or the context clearly dictates otherwise.

The term "comprising" is an open-ended transitional phrase. A list of elements following the transitional phrase "comprising" is a non-exclusive list, such that elements in addition to those specifically recited in the list can also be present. The phrase "consisting essentially of" limits the composition of a component to the specified materials and those that do not materially affect the basic and novel characteristic(s) of the component. The phrase "consisting of" limits the composition of a component to the specified materials and excludes any material not specified.

As used herein, the term "about" refers to a value that is within ±10% of the value stated. For example, about 3 degrees can include any number from 2.7 degrees to 3.3 degrees.

Where a range of numerical values comprising upper and lower values is recited herein, unless otherwise stated in specific circumstances, the range is intended to include the endpoints thereof, and all integers and fractions within the range. It is not intended that the disclosure or claims be limited to the specific values recited when defining a range. Further, when an amount, concentration, or other value or parameter is given as a range, one or more ranges, or as list of upper values and lower values, this is to be understood as specifically disclosing all ranges formed from any pair of any upper range limit or value and any lower range limit or value, regardless of whether such pairs are separately disclosed.

The terms of "front", "rear", "down", "up", "bottom", "upper", "horizontal", "vertical", "right", "left" or any reference to sides or directions are used throughout the description for the sake of brevity alone and are relative terms only and not intended to require a particular component orientation.

As used herein, "plants" may refer, inter alia, to a culture of aquatic plants, such as a plant from the Lemnaceae family (duckweed), such as *Spirodela* plants, *Landoltia* plants, *Lemna* plants, *Wolffiella* plants, or *Wolffia* plants.

As used herein, "microbiome" may refer to microorganism(s), such as bacteria, archaea, fungi, algae, microalgae, and/or small protists, comprising characteristics which have distinct physio-chemical properties that can benefit humans, plants, and/or other living organisms.

As used herein, "pathogens" may refer to any non-desired microorganism, such as bacteria, fungi, microalgae, or parasites, which have distinct physio-chemical properties that can harm humans, plants, and/or other living organisms.

As used herein, "sterile" or "sterilized" or "sterility" refers to an environment or chamber that is sealed and physically isolated from the external surroundings, designed to prevent the uncontrolled introduction of microorganisms, particulates, or contaminants. The sterile state represents a biologically clean starting point, in which no viable external organisms are present unless intentionally introduced.

As used herein, "receptacle" or "receptacles" is intended to include trays, containers, or any other vessel used for holding and/or cultivating, inter alia, plants and/or microbiome.

As used herein, "compartment" or "compartments" is intended to include trays, containers, or any other vessel used for holding and/or cultivating, inter alia, plants or microbiome, that may be enclosed within a receptacle.

As used herein, "sealed" may refer to an environment free of any gaps exceeding 0.2 μm between the internal sterile environment and the external environment of the system, i.e. preventing even singular microorganism from penetrating into the plant's sterile environment.

As used herein, "beneficial promoters" is intended to include molecules, compounds, or biologically active substances that are produced and/or secreted by microbiome organisms associated with a plant, wherein said molecules (i) exert a direct beneficial effect on the plant, such as stimulating plant growth, enhancing plant health, promoting plant development, and/or increasing plant resilience, such as indole-3-acetic acid (IAA) and/or (ii) exert an indirect beneficial effect by being absorbed or incorporated into the plant, thereby enhancing the plant or its derived products, for example by improving the nutritional content, therapeutic benefits, or functional qualities, such as vitamin B12.

As used herein, "plant-inoculum" is intended to include plants that are introduced into a controlled environment (e.g. a bioreactor, a growth receptacle) to initiate and/or sustain the growth of a plant in the controlled environment.

As used herein, "inoculating" is intended to include the process of introducing plants into a controlled environment (e.g. a bioreactor, a growth receptacle) to initiate and/or sustain the growth of a plant in the controlled environment.

As used herein, "exudate," "exudates," and "exudated" are intended to include the process of producing and discharging molecules (e.g. microbiome stimulants) secreted by plants, that may be beneficial to the microbiome.

Some of the plants, such as aquatic edible plants, can be grown in a sterile and controlled environment as a monoculture for enabling a highly stable, productive, repetitive, and controllable cultivation process, along with a high quality and safe produce without the need of using pesticides, antibiotics, or any other toxins. However, in the natural habitat, these aquatic edible plants typically live in holobionts with complex assemblages of microorganism (e.g. microbiome) that may play an important role in their growth and phytoremediation ability. Thus, the plants that live in a sterile and controlled environment may lack the microbiome beneficial promoters that exist in the natural habitat. Subsequently, while efficiently maintaining a sterile cultivation environment for the plants for protecting the plants from harmful pathogens, a need arises for providing these plants with selected microbiome beneficial promoters for improving their growth rate and resilience. Furthermore, it may also be desirable to add human selected microbiome to the plants that may be used for human consumption. According to some embodiments, the desired beneficial promoters may be added to the plants during different stages of cultivation, while preventing pathogens from infiltrating the plant cultures.

According to some embodiments, all receptacles, conduits, and other parts intended for use in the cultivation process are sterilized beforehand and kept sterile and sealed during cultivation, in order to prevent contamination agents (e.g. pathogens) from entering the cultivation process and contaminating the plants and the controlled environment.

FIG. 1 shows a top view of an exemplary receptacle for cultivating aquatic plants in a controlled environment, according to some embodiments. For example, the receptacle 300 may be used as a tray for growing aquatic plants on fluid (e.g. culture medium) under controlled conditions, such as in a bioreactor. The receptacle is sterile and sealed. According to some embodiments, the receptacle 300 is a tray which is covered and sealed with a lid. According to some embodiments, the receptacle 300 has at least two orifices, such as orifices 310 and/or 311, for transferring substance into or out of the receptacle 300. The orifices 310 and/or 311 may have attached conduits, such as conduits 320 and/or 321, which may be used for connecting other conduits from other receptacles. The culture medium for cultivating plants is inserted into the receptacle 300 and then a plant-inoculum is inserted into the receptacle 300 for the initiation of cultivation. According to some embodiments, the culture medium is inserted into the receptacle 300 through at least one of the orifices, such as orifice 310 or 311, and then a plant-inoculum is inserted into the receptacle 300 through at least one of the orifices, such as orifice 310 or 311, for cultivation.

Figure 2:
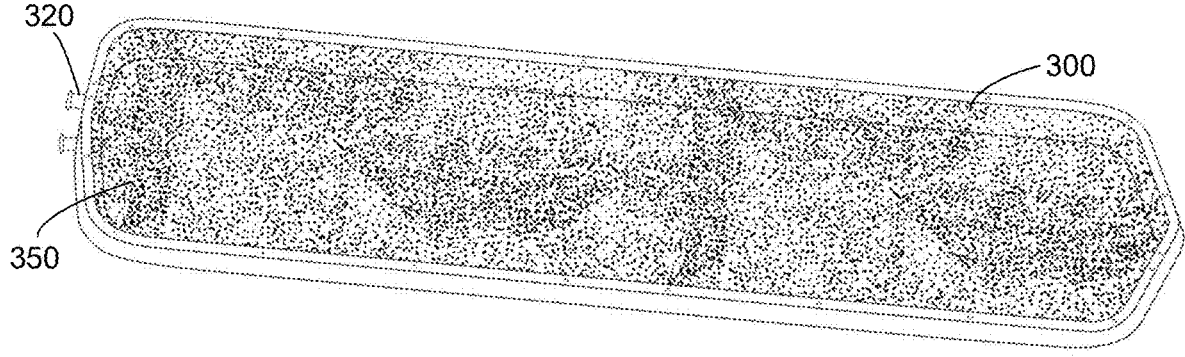
FIG. 2 shows a perspective view of aquatic plants floating over fluids in a receptacle, according to some embodiments.

FIG. 2 shows a perspective view of aquatic plants floating over fluids in a receptacle, according to some embodiments. The receptacle 300, as described in relation to FIG. 1, may be used for cultivating aquatic plants, such as floating plants 350, and may have orifices with connected conduits, such as conduits 320. According to some embodiments, each of the conduits that are attached to the orifices is sealed and may have a valve for controlling the flow through the orifice. At first, a culture medium fluid together with plant-inoculum of floating plants 350 may be flowed into the receptacle 300 (e.g. through conduit 320), thus inoculating the floating plants 350 in the receptacle 300 for cultivation. Then, the floating plants 350 are cultivated and provided with their basic needs (e.g. nutrients and light) to create favorable conditions for the floating plants 350 to multiply and grow while floating over the fluid in the receptacle 300.

Figure 3:
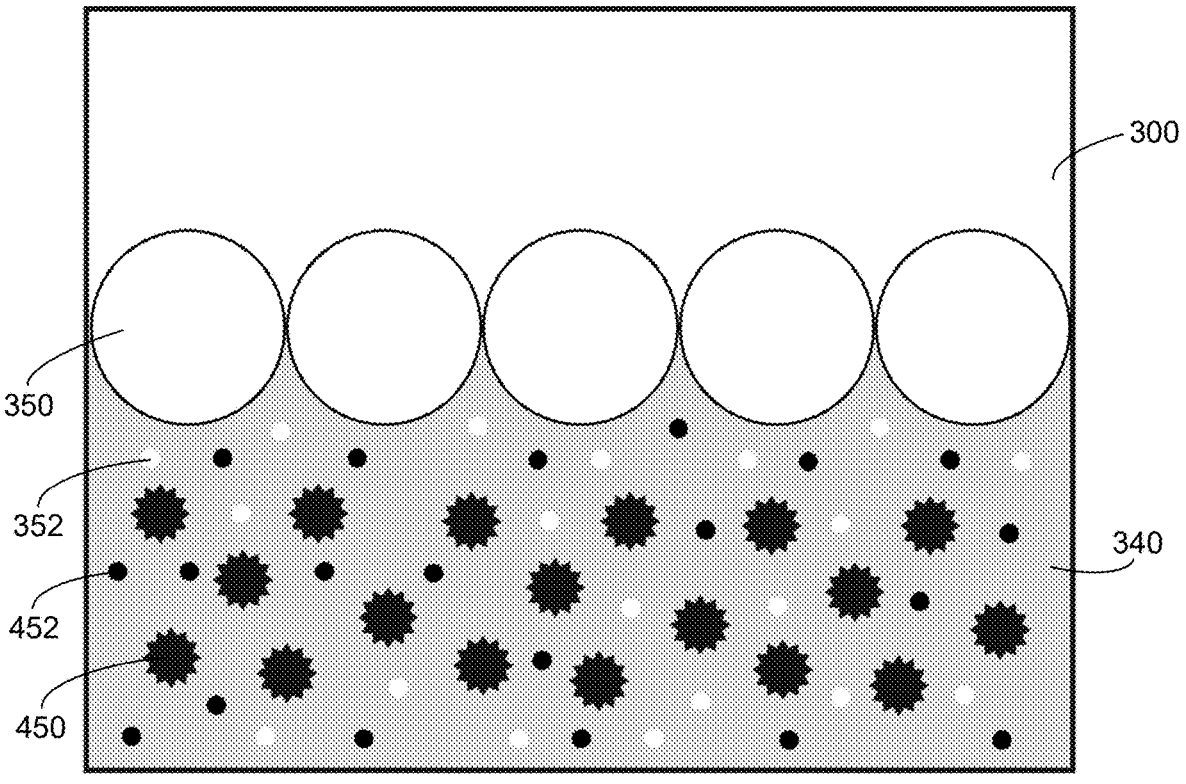
FIG. 3 shows a schematic side view of one receptacle with aquatic plants floating over fluids and microbiome in the fluids, according to some embodiments.

FIG. 3 shows a schematic side view of one receptacle 300 with aquatic plants floating over fluids and microbiome in the fluids, according to some embodiments. According to some embodiments, a preselected microbiome, such as microorganism 450, with known beneficial effect may be added to the receptacle 300, as described for example in relation to FIG. 2, together with the plants (e.g. floating plants 350) and cultivated together as a co-culture. According to some embodiments, the preselected microbiome, capable of imparting the beneficial promoters associated with the floating plants 350, is added to the receptacle and co-cultured with the floating plants 350. The addition of the microbiome directly to the plant culture in receptacle 300, sharing the same controlled and sterile cultivation environment with the floating plants 350, allows the microbiome imparted beneficial promoters (e.g. microbiome beneficial promoters 452) to migrate in the shared culture medium from the microbiome to the floating plants 350 and/or allows the plant exudates (e.g. microbiome stimulants 352) that are microbiome stimulants to migrate from the floating plants 350 to the microbiome. According to some embodiments, the cultivated microbiome may be submerged within the medium fluid 340 and/or adhered to the surface of the floating plants 350 and/or inside the floating plants 350. For example, recent studies have identified microbiome of specific bacteria such as *Aeromonas* and/or *Pseudomonas alcaligenes* as capable, through a symbiotic relationship with duckweed, of producing vitamin B12 (cobalamin), which is essential for human health, in the duckweed culture. Vitamin B12 is a stable small molecule that may be secreted by specific bacteria into the culture medium. Thus, since the duckweed can naturally accumulate vitamin B12 from the environment, likely through a symbiotic association with vitamin B12-producing bacteria that live on or around the plant, adding the preselected bacteria (e.g. microorganism 450) into the receptacle 300 together with the plants (e.g. floating plants 350), either alone or as a microbial consortium, and cultivating them together may provide increased vitamin B12 content in the floating plants 350.

Figure 4:
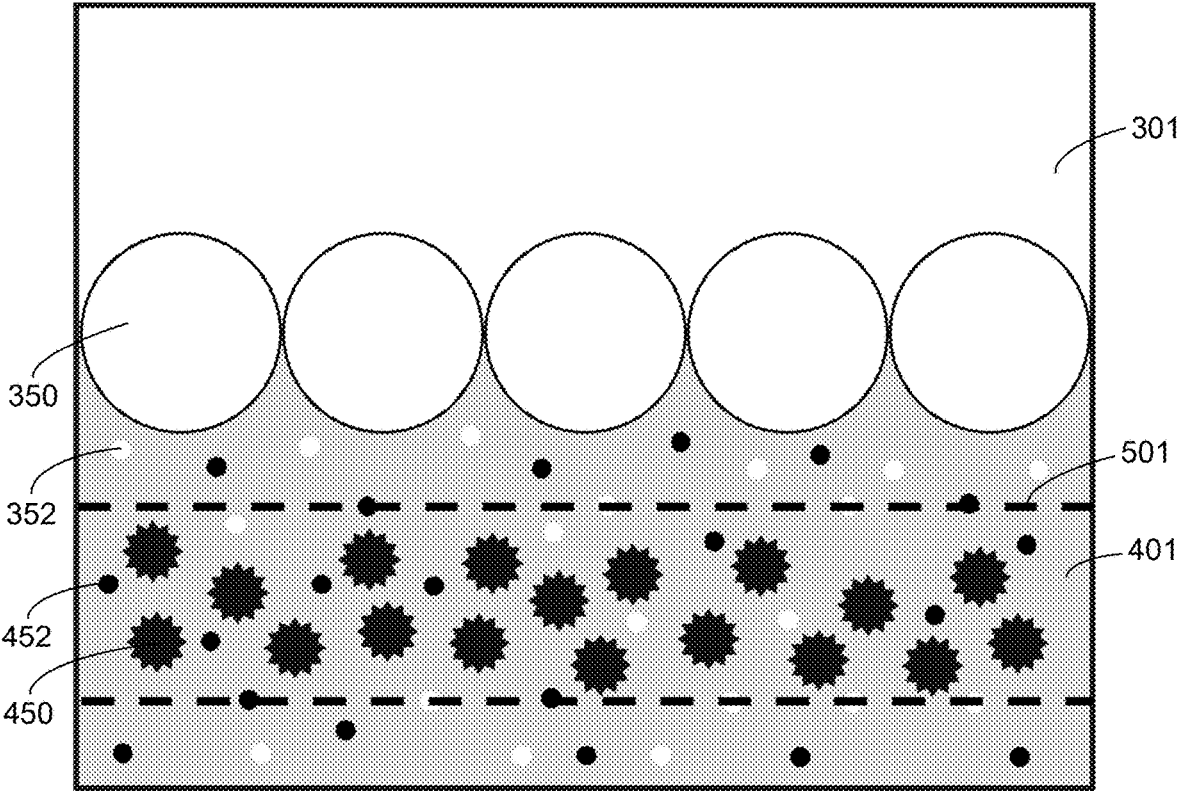
FIG. 4 shows a schematic side view of one receptacle with aquatic plants floating over fluids and microbiome in a compartment within the receptacle, according to some embodiments.

FIG. 4 shows a schematic side view of one receptacle with aquatic plants floating over fluids and microbiome in a compartment within the receptacle, according to some embodiments. According to some embodiments, the compartment 401 may be inside the receptacle 301, e.g. within the medium fluid of the receptacle. According to some embodiments, the compartment 401 has at least one filter, such as filter 501, for separating and filtering between the microbiome (e.g. microorganism 450) in the compartment 401 and the plants (e.g. floating plants 350) in the receptacle 301, where the connection (e.g. fluid communication) between the microbiome in the compartment 401 and the receptacle 301 is done only through the filter(s). The filter 501 may permit the transfer of the microbiome beneficial promoters 452, imparted by the microbiome, to the floating plants 350 while preventing the transfer of the microbiome to the floating plants 350. The compartment 401 may contain the preselected microbiome, such as microorganism 450, capable of imparting beneficial promoters (e.g. microbiome beneficial promoters 452) associated with the plants, such as floating plants 350 floating over fluids in receptacle 301, as described in relation to FIG. 2. According to some embodiments, the floating plants 350 cultivated in receptacle 301 may exudate molecules (e.g. microbiome stimulants 352) that are stimulators of the microbiome present in the compartment 401. According to some embodiments, the preselected microbiome and the plants are co-cultured within a single receptacle (e.g. receptacle 301), sharing a common culture medium (e.g. the same controlled and sterile cultivation environment), where the microbiome is held in a separate compartment (e.g. compartment 401) within the receptacle 301 and where the culture medium is shared via the filter 501. According to some embodiments, the compartment 401 may be configured with a filter positioned at one of its sides, adapted to selectively permit the passage of desired molecules while restricting the passage of the organisms. The filter 501 may enable molecular exchange between the microbiome within compartment 401 and the plants located in receptacle 301. For example, beneficial promoters, such as vitamin B12, secreted by the microbiome into the medium of compartment 401 may migrate through filter 501 into the external medium and diffuse toward the plants. According to some embodiments, plant-derived exudates, such as microbiome stimulants 352, may migrate from the plants in receptacle 301 through filter 501 into the microbiome compartment 401. Thus, both cultures of the receptacle 301, the plants and the microbiome, may each receive their desired molecules without being contaminated by the organisms that may harm them. According to some embodiments, the filter between the compartment 401 and the receptacle 301 is a porous membrane filter having about 0.2 μm pore size membrane for allowing the migration of molecules (e.g. stimulants and/or promoters), while preventing microbiome organisms from migrating from the compartment 401 to the plants and preventing plants from migrating into the microbiome compartment 401. According to some embodiments, the filter between the compartment 401 and the receptacle 301 is a porous membrane filter having about 0.4 μm pore size membrane. According to some embodiments, the filter between the compartment 401 and the receptacle 301 is a porous membrane filter having about 0.8 μm pore size membrane. According to some embodiments, the filter between the compartment 401 and the receptacle 301 is a porous membrane filter having a pore size in a range from about 0.1 μm to about 10 μm. According to some embodiments, the filter between the compartment 401 and the receptacle 301 is a 6-Well Insert 0.4 μm PET translucent filter.

Figure 5:
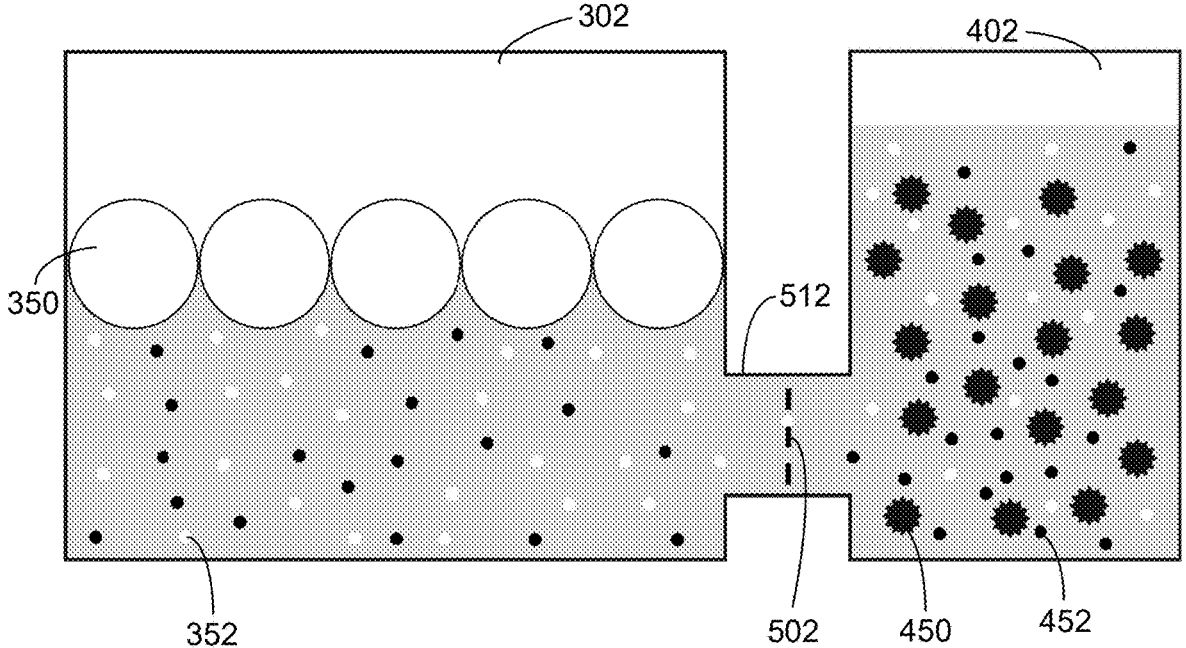
FIG. 5 shows a schematic side view of one receptacle with aquatic plants floating over fluids and a second receptacle with microbiome, where both receptacles are connected by a conduit, according to some embodiments.

FIG. 5 shows a schematic side view of one receptacle with aquatic plants floating over fluids and a second receptacle with microbiome, where both receptacles are connected by a conduit, according to some embodiments. The receptacle 302, as described in relation to FIG. 2, may be used for cultivating aquatic plants, whereas the receptacle 402 may be used for cultivating preselected microbiome, capable of imparting beneficial promoters associated with the aquatic plants in receptacle 302. According to some embodiments, the receptacle 302 is connected (e.g. in fluid communication) with the receptacle 402 through at least one conduit, such as conduit 512, where the conduit is used to migrate beneficial promoters from the microbiome receptacle 402 to the plant receptacle 302 and/or to migrate plant exudates (e.g., microbiome stimulants) from the plant receptacle 302 to the microbiome receptacle 402. According to some embodiments, the preselected microbiome and the plants are cultivated separately in separate receptacles, where the receptacles are connected by at least one conduit which enables a fluid communication between the microbiome culture medium and the plant culture medium. According to some embodiments, the conduit has a filter, such as filter 502, for filtering the undesired organisms while allowing the desired molecules to pass and migrate between the receptacle 402 and the receptacle 302. According to some embodiments, the filter 502 permits the migration of the beneficial promoters imparted by the microbiome from receptacle 402 to the plants in receptacle 302, while preventing the transfer of the microbiome organisms to the plant receptacle 302. For example, microbiome beneficial promoters 452 can migrate from the microbiome receptacle 402 leftwards to the plant receptacle 302 through the filter 502, whereas the microbiome stimulants 352 of the plant exudates may migrate rightwards from the plant receptacle 302 to the microbiome receptacle 402 through the filter 502. Thus, both the plant culture and the microbiome culture may receive their beneficial molecules while being cultivated separately, each under its optimized conditions. According to some embodiments, the filter 502 between the receptacle 402 and the receptacle 302 is a porous membrane filter having about 0.2 μm pore size membrane for allowing the migration of stimulants and promoters while preventing microbiome organisms from migrating to the plant receptacle 302 and preventing plants from migrating to the microbiome receptacle 402. According to some embodiments, the filter 502 between the receptacle 402 and the receptacle 302 is a porous membrane filter having about 0.4 μm pore size membrane. According to some embodiments, the filter 502 between the receptacle 402 and the receptacle 302 is a porous membrane filter having a pore size membrane in a range from about 0.1 μm to about 10 μm. According to some embodiments, the conduit 512 may have its own valve. According to some embodiments, the receptacle 302 is connected to (e.g. in fluid communication with) the receptacle 402 through at least two conduits, where one of the conduits is used to migrate beneficial promoters from the microbiome receptacle 402 to the plant receptacle 302 and the other conduit is used to migrate stimulants from the plant receptacle 302 to the microbiome receptacle 402. According to some embodiments, each of the conduits may have its own filter. According to some embodiments, each of the conduits may have its own valve.

According to some embodiments, the plant receptacle, as described in relation to FIG. 5, is not connected to (e.g. not in fluid communication with) the microbiome receptacle. According to some embodiments, the preselected microbiome and the plants are cultivated separately in separated receptacles, i.e. without fluid communication between the microbiome culture medium and the plant culture medium. According to some embodiments, beneficial promoters produced by the microbiome may be collected from the microbiome receptacle and subsequently introduced into the plant receptacle in a non-continuous manner as substrates incorporated into the plant culture medium. According to some embodiments, stimulants exudated from the plants may be collected from the plant receptacle and subsequently introduced into the microbiome receptacle in a non-continuous manner as substrates incorporated into the microbiome culture medium. According to some embodiments, the beneficial promoters imparted by the microbiome are first filtered before they are gathered and supplied to the plants as substrates in the microbiome culture medium in the microbiome receptacle. According to some embodiments, the stimulants exudated from the plants are first filtered before they are gathered and supplied to the microbiome as substrates in the plant culture medium in the plant receptacle.

According to some embodiments, beneficial promoters, such as vitamin B12, imparted from the microbiome can be purified, stored, and then transferred into the medium of a separate plant receptacle for plant absorption. Known industrial methods, such as microfiltration, centrifugation, adsorption on specific resins, and chromatography, may be used to purify beneficial promoters, such as vitamin B12, from microbial cultures (e.g. *Propionibacterium, Pseudomonas* and/or *Aeromonas*). After purification, beneficial promoters can be stored as a stable aqueous solution or in lyophilized (e.g. freeze-dried) powder for extended periods.

According to some embodiments, the purified beneficial promoters, such as vitamin B12, can be added to the plant's growth medium. Plants, including duckweed, can absorb small molecules of beneficial promoters, such as vitamin B12, directly through their surfaces, mainly via simple diffusion or facilitated transporters. Thus, transferring purified beneficial promoters to the plant bioreactor can cause the plants to absorb it. This method of adding beneficial promoters, such as vitamin B12, to the plant's growth medium allows the control over the dosage of beneficial promoters, as the dosage can be precisely added to optimize plant uptake.

While the above description discloses many embodiments and specifications of the invention(s), these were described by way of illustration and should not be construed as limitations on the scope of the invention(s). The described invention(s) may be carried into practice with many modifications which are within the scope of the appended claims.

What is claimed is:

1. A method for supplying microbiome beneficial promoters to plants, the method comprising:

providing a plant receptacle for cultivating said plants;

inserting plant culture medium into said plant receptacle for cultivating said plants;

inoculating said plants in said plant receptacle for cultivation;

cultivating said plants under sterile conditions in said plant receptacle; and providing a preselected microbiome for imparting microbiome beneficial promoters associated with said plants in said plant receptacle, wherein:

said plant receptacle comprises at least one compartment separated by at least one filter from said plants for cultivating said preselected microbiome, wherein said at least one filter permits the transfer of said microbiome beneficial promoters imparted by said preselected microbiome to said plants while preventing the transfer of said preselected microbiome to said plants; and said preselected microbiome and said plants are co-cultured within said plant receptacle and share said plant culture medium, while said preselected microbiome is held in a separate compartment within said plant receptacle.

2. A method for supplying microbiome beneficial promoters to plants, the method comprising:

providing a plant receptacle for cultivating said plants;

inserting plant culture medium into said plant receptacle for cultivating said plants;

inoculating said plants in said plant receptacle for cultivation; and cultivating said plants under sterile conditions in said plant receptacle, wherein:

said plants are cultivated in said plant receptacle, and a preselected microbiome is provided and cultivated in a microbiome receptacle separate from said plant receptacle;

said plant receptacle comprises at least one conduit comprising at least one filter for connecting to said microbiome receptacle;

said at least one conduit enables a fluid communication between a microbiome culture medium in said microbiome receptacle and said plant culture medium in said plant receptacle; and said at least one filter permits the transfer of said microbiome beneficial promoters imparted by said preselected microbiome to said plant receptacle while preventing the transfer of said preselected microbiome to said plant receptacle.

3. The method according to claim 1 or claim 2, further comprising transferring microbiome stimulators exudated by said plants from said plants to said preselected microbiome wherein the filter transfers the microbiome stimulators exudated by said plants from said plants to said preselected microbiome.

4. The method according to claim 1 or claim 2, wherein said plants receive said microbiome beneficial promoters imparted from said preselected microbiome as substrates in said plant culture medium.

5. The method according to claim 2, wherein said preselected microbiome receives stimulants exudated from said plants as substrates in said microbiome culture medium.

6. A system for supplying microbiome beneficial promoters to plants, the system comprising:

a plant receptacle for cultivating said plants under sterile conditions;

plant culture medium for inserting into said plant receptacle for cultivating said plants;

plant-inoculum for inserting into said plant receptacle for cultivation; and a preselected microbiome, wherein:

said plant receptacle comprises at least one compartment separated by at least one filter from said plants for cultivating said preselected microbiome;

said at least one filter permits the transfer of said microbiome beneficial promoters imparted by said preselected microbiome to said plants while preventing the transfer of said preselected microbiome to said plants; and said preselected microbiome and said plants are co-cultured within said receptacle and share said plant culture medium.

7. A system for supplying microbiome beneficial promoters to plants, the system comprising:

a plant receptacle for cultivating said plants under sterile conditions;

plant culture medium for inserting into said plant receptacle for cultivating said plants;

plant-inoculum for inserting into said plant receptacle for cultivation; and a microbiome receptacle for cultivating a preselected microbiome, wherein:

said plants are cultivated in said plant receptacle and said preselected microbiome is cultivated in said microbiome receptacle separate from said plant receptacle;

said plant receptacle comprises at least one conduit comprising at least one filter for connecting to said microbiome receptacle;

said at least one conduit enables a fluid communication between a microbiome culture medium in said microbiome receptacle and said plant culture medium in said plant receptacle, and said at least one filter permits the transfer of said microbiome beneficial promoters imparted by said preselected microbiome to said plants while preventing the transfer of said microbiome to said plant receptacle.

8. The system according to claim 6 or claim 7, wherein said at least one filter is further used for transferring microbiome stimulators exudated by said plants from said plants to said preselected microbiome while preventing the transfer of said plants.

9. The system according to claim 6 or claim 7, wherein said plant culture medium comprises said microbiome beneficial promoters imparted from said preselected microbiome as substrates in said plant culture medium.

10. The system according to claim 7, wherein said microbiome culture medium comprises stimulants exudated from said plants as substrates in said microbiome culture medium.

* * * * *